(12) United States Patent  
Matsumoto et al.

(10) Patent No.: US 12,212,201 B2
(45) Date of Patent: Jan. 28, 2025

(54) COOLING SYSTEM, STATOR FOR ROTATING ELECTRIC MACHINE, AND SEGMENT COIL

(71) Applicant: TOYOTA JIDOSHA KABUSHIKI KAISHA, Toyota (JP)

(72) Inventors: Masashi Matsumoto, Nagoya (JP); Kohei Watanabe, Okazaki (JP); Hiroshi Inano, Miyoshi (JP); Hazuki Kawamura, Nisshin (JP); Tomoyuki Sawada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 375 days.

(21) Appl. No.: 17/750,810

(22) Filed: May 23, 2022

(65) Prior Publication Data

US 2022/0407377 A1 Dec. 22, 2022

(30) Foreign Application Priority Data

Jun. 22, 2021 (JP) .................. 2021-103082

(51) Int. Cl.
*H02K 3/24* (2006.01)
*H02K 1/20* (2006.01)
*H02K 9/19* (2006.01)

(52) U.S. Cl.
CPC .............. *H02K 3/24* (2013.01); *H02K 1/20* (2013.01); *H02K 9/19* (2013.01)

(58) Field of Classification Search
CPC .. H02K 1/06; H02K 1/20; H02K 1/12; H02K 1/16; H02K 1/04; H02K 1/14; H02K 1/24; H02K 1/28; H02K 1/32; H02K 1/48; H02K 15/0025; H02K 15/0031; H02K 15/0037; H02K 15/0056; H02K 15/0087; H02K 15/0414; H02K 15/0421; H02K 15/0428;
(Continued)

(56) References Cited

U.S. PATENT DOCUMENTS 4,959,570 A * 9/1990 Nakamura ............... H02K 9/19
315/54
5,363,546 A * 11/1994 Bradtmueller ......... H02K 13/04
29/736
(Continued)

FOREIGN PATENT DOCUMENTS

JP 2002-58189 A 2/2002
JP 2004-516788 A 6/2004
(Continued)

*Primary Examiner* — Terrance L Kenerly
*Assistant Examiner* — Ahmed F Seck
(74) *Attorney, Agent, or Firm* — Oliff PLC

(57) ABSTRACT

A cooling system is provided. Coil ends protrude outward from a first end of a stator core in a direction along a central axis. An imaginary straight line is orthogonal to both of a central axis of a core body and an axis extending in an up-down direction. Half the coil ends above the imaginary straight line are in a first portion. Each of the segment coils in the first portion includes an outer peripheral surface that faces in a direction opposite from the central axis. The outer peripheral surface of each of the segment coils includes a twisted surface. The direction in which the twisted surface faces becomes closer to the direction facing the stator core as the twisted surface extends toward the first end of the stator core.

19 Claims, 3 Drawing Sheets

(58) Field of Classification Search
CPC .... H02K 15/064; H02K 15/067; H02K 15/08; H02K 15/085; H02K 9/00; H02K 9/04; H02K 9/12; H02K 9/16; H02K 9/19; H02K 9/193; H02K 9/197; H02K 3/24; H02K 3/02; H02K 3/04; H02K 3/28; H02K 3/32; H02K 3/12; H02K 3/14
See application file for complete search history.

(56) References Cited

U.S. PATENT DOCUMENTS

| | | | | |
|---|---|---|---|---|
| 5,682,074 | A * | 10/1997 | Di Pietro | B22D 19/0054 310/45 |
| 6,339,871 | B1 * | 1/2002 | Maesoba | H02K 15/0428 29/596 |
| 8,884,479 | B2 * | 11/2014 | Burnett | H02K 9/19 310/58 |
| 2002/0017825 | A1 | 2/2002 | Oohashi et al. | |
| 2002/0074870 | A1 * | 6/2002 | Vandervort | H02K 3/24 310/58 |
| 2005/0166393 | A1 * | 8/2005 | Sawada | H02K 15/0428 29/596 |
| 2008/0136271 | A1 * | 6/2008 | Alfermann | H02K 1/20 310/59 |
| 2010/0187938 | A1 * | 7/2010 | Yamamoto | H02K 3/12 310/195 |
| 2017/0264156 | A1 | 9/2017 | Ogami et al. | |
| 2018/0019642 | A1 * | 1/2018 | Wang | F03D 80/60 |
| 2018/0069455 | A1 * | 3/2018 | Engblom | H02K 9/19 |
| 2018/0233995 | A1 * | 8/2018 | Okuda | H02K 15/005 |
| 2020/0006996 | A1 * | 1/2020 | Jaluthariya | H02K 3/505 |
| 2020/0028419 | A1 * | 1/2020 | Yoshida | H02K 15/064 |
| 2021/0328474 | A1 * | 10/2021 | Endo | H02K 3/28 |
| 2022/0037955 | A1 * | 2/2022 | Wang | H02K 9/193 |

FOREIGN PATENT DOCUMENTS

| | | |
|---|---|---|
| JP | 2006-311750 A | 11/2006 |
| JP | 2011-234531 A | 11/2011 |
| JP | 2016-101003 A | 5/2016 |
| JP | 2017-163784 A | 9/2017 |
| JP | 2019-80416 A | 5/2019 |

* cited by examiner

COOLING SYSTEM, STATOR FOR ROTATING ELECTRIC MACHINE, AND SEGMENT COIL

BACKGROUND

1. Field

The present disclosure relates to a cooling system, a stator for a rotating electric machine, and a segment coil.

2. Description of Related Art

Japanese Laid-Open Patent Publication No. 2006-311750 discloses a cooling system that includes a rotating electric machine and a cooling oil passage, through which oil flows. The rotating electric machine includes an annular stator and a rotor, which is located radially inward of the stator. The stator includes a stator core and segment coils. The stator core is annular. The segment coils are wound about the stator.

Each segment coil includes coil ends, which are portions that protrude from end faces of the stator in a direction along the central axis of the stator. The cooling oil passage includes spray holes. The cooling oil passage is located above the stator core.

When oil is sprayed from the cooling oil passage toward the coil ends of the rotating electric machine, the oil flows downward due to gravity after contacting the coil ends. Thus, the oil is not spread to the entire coil ends and may fail to achieve the expected cooling effect.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a cooling system is provided that includes a rotating electric machine mounted on a vehicle, and a cooling oil passage through which oil flows. The rotating electric machine includes a stator core and segment coils attached to the stator core. The stator core includes an annular core body and teeth. The annular core body includes a central axis. The central axis is orthogonal to an axis that extends in an up-down direction of the vehicle. The teeth extend from an inner circumferential surface of the core body toward the central axis. Each of the segment coils is inserted into a gap between an adjacent pair of the teeth. Each of the segment coils includes a coil end. The coil end protrudes outward from a first end of the stator core in a direction along the central axis. The cooling oil passage includes a spray hole. The spray hole is configured to spray oil toward the coil ends. The spray hole is located above the coil ends. As viewed in a direction along the central axis, a straight line that is orthogonal to both the central axis and the axis extending in the up-down direction is defined as an imaginary straight line. Half the coil ends above the imaginary straight line are in a first portion. Each of the segment coils in the first portion includes an outer peripheral surface. The outer peripheral surfaces face in a direction opposite from the central axis. The outer peripheral surface of each of the segment coils includes a twisted surface. Each of the twisted surfaces is configured such that a direction in which the twisted surface faces becomes closer to a direction facing the stator core as the twisted surface extends toward the first end of the stator core.

In the above-described configuration, the oil sprayed from the spray hole contacts the outer peripheral surfaces of the segment coils in the first portion. The oil that has contacted the outer peripheral surfaces of the segment coils spills from the segment coils to the outside of the stator or flows along the outer peripheral surfaces of the segment coils. With the above-described configuration, the oil that has contacted the outer peripheral surfaces of the segment coils is easily guided toward the first end of the stator core along the twisted surfaces in the outer peripheral surfaces. This reduces the amount of oil that spills to the outside of the stator. The oil that has been guided toward the first end of the stator falls along a great number of the segment coils and thus efficiently cools the coil ends.

In the above-described configuration, half the coil ends below the imaginary straight line are in a second portion. Each of the segment coils in the second portion includes an inner peripheral surface. The inner peripheral surfaces face in a direction facing the central axis. The twisted surfaces in the outer peripheral surfaces of the segment coils are first twisted surfaces. The inner peripheral surface of each of the segment coils includes a second twisted surface. Each of the second twisted surfaces is configured such that a direction in which the second twisted surface faces becomes closer to the direction facing the stator core as the second twisted surface extends toward the first end of the stator core.

In the above-described configuration, the oil that has dropped from the segment coils in the first portion contacts the inner peripheral surfaces of the segment coils in the second portion. The oil that has contacted the inner peripheral surfaces of the segment coils spills from the segment coils to the outside of the stator or flows along the inner peripheral surfaces of the segment coils. The oil that has contacted the inner peripheral surfaces of the segment coils is easily guided toward the first end of the stator core along the second twisted surfaces in the inner peripheral surfaces of the segment coils. This reduces the amount of oil that spills to the outside of the stator. The oil that has been guided toward the first end of the stator falls along a great number of the segment coils and thus cools the coil ends effectively.

In the above-described configuration, each of the segment coils includes dimples in a surface of the segment coil. The dimples are circular recesses in a plan view. The above-described configuration allows the oil that flows along the segment coils to flow smoothly along the surfaces of the segment coils. This prevents the oil from spilling from the segment coils to the outside of the stator.

In another general aspect, a stator for a rotating electric machine is provided. The stator includes a stator core and segment coils attached to the stator core. The stator core includes an annular core body including a central axis, and teeth that extend from an inner circumferential surface of the core body toward the central axis. Each of the segment coils is inserted into a gap between an adjacent pair of the teeth. Each of the segment coils includes a coil end. The coil end protrudes outward from a first end of the stator core in a direction along the central axis. As viewed in a direction along the central axis, a straight line that is orthogonal to the central axis is defined as an imaginary straight line. Half the coil ends on one side o the imaginary straight line are in a first portion. Each of the segment coils in the first portion includes an outer peripheral surface. The outer peripheral surfaces face in a direction opposite from the central axis. The outer peripheral surface of each of the segment coils includes a twisted surface. Each of the twisted surfaces is configured such that a direction in which the twisted surface faces becomes closer to a direction facing the stator core as the twisted surface extends toward the first end of the stator core.

It is assumed that the stator of the above-described configuration is arranged such that the central axis is horizontal and the first portion is in an upper part. It is also assumed that oil is supplied to the stator from above. The oil contacts the outer peripheral surfaces of the segment coils in the first portion. The oil that has contacted the outer peripheral surfaces of the segment coils spills from the segment coils to the outside of the stator or flows along the outer peripheral surfaces of the segment coils. With the above-described configuration, the oil that has contacted the outer peripheral surfaces of the segment coils is easily guided toward the first end of the stator core along the twisted surfaces in the outer peripheral surfaces. This reduces the amount of oil that spills to the outside of the stator. The oil that has been guided toward the first end of the stator falls along a great number of the segment coils and thus efficiently cools the coil ends.

In the above-described configuration, half the coil ends on another side of the imaginary straight line are in a second portion. Each of the segment coils in the second portion includes an inner peripheral surface. The inner peripheral surfaces face in a direction facing the central axis. The twisted surfaces in the outer peripheral surfaces of the segment coils are first twisted surfaces. The inner peripheral surface of each of the segment coils includes a second twisted surface. Each of the second twisted surfaces is configured such that a direction in which the second twisted surface faces becomes closer to the direction facing the stator core as the second twisted surface extends toward the first end of the stator core.

In the above-described configuration, if the stator is arranged such that the first portion is located in an upper part and the second portion is located in a lower part, the oil that has dropped from the segment coils in the first portion contacts the inner peripheral surfaces of the segment coils in the second portion. The oil that has contacted the inner peripheral surfaces of the segment coils spills from the segment coils to the outside of the stator or flows along the inner peripheral surfaces of the segment coils. The oil that has contacted the inner peripheral surfaces of the segment coils is easily guided toward the first end of the stator core along the second twisted surfaces in the inner peripheral surfaces. This reduces the amount of oil that spills to the outside of the stator. The oil that has been guided toward the first end of the stator falls along a great number of the segment coils and thus cools the coil ends effectively.

In another general aspect, a segment coil configured to be attached to a stator core is provided. The segment coil includes two straight sections that extend parallel with each other, and two curved sections. The curved sections are configured to connect ends on a same side of the straight sections. An axis that is orthogonal to a plane that includes both straight sections is defined as an orthogonal axis. Each of the curved sections includes a side surface that faces one of two directions along the orthogonal axis from the curved section. Each of the side surfaces includes a twisted surface. Each of the twisted surfaces is configured such that a direction in which the twisted surface faces becomes closer to a direction facing the corresponding straight section as the twisted surface extends toward an intersection between the corresponding straight section and the curved section.

It is assumed that the segment coil having the above-described configuration is attached to a stator core having a central axis. The stator core is arranged such that the central axis is horizontal and the twisted surface is in an upper part. It is also assumed that oil is supplied to the stator core from above. The oil contacts the twisted surface of the segment coil. With the above-described configuration, the oil that has contacted the twisted surface of the segment coil is easily guided along the twisted surface toward the intersection of the straight section and the curved section. That is, the oil is readily spread to the entire segment coil along the twisted surface.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

<Schematic Structure>

A cooling system 100 according to one embodiment will now be described with reference to FIGS. 1 to 5.

Figure 1:
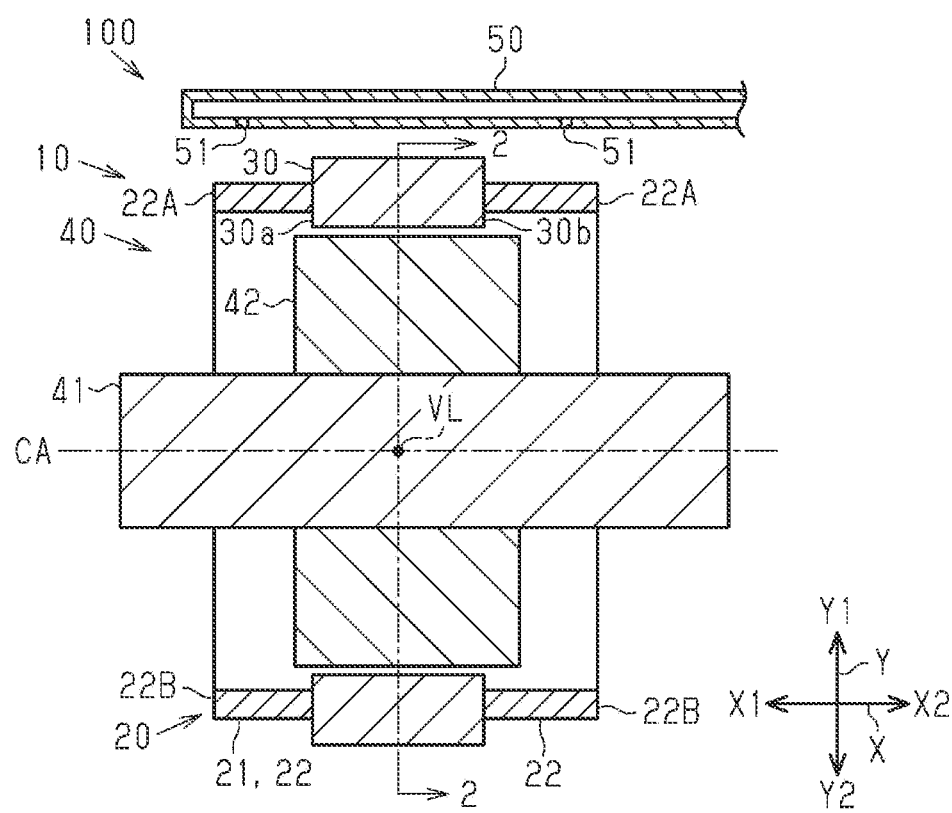
FIG. 1 is a schematic end view of a cooling system.

As shown in FIG. 1, the cooling system 100 includes a motor-generator 10 and a cooling oil passage 50.

The motor-generator 10 includes a stator 20 and a rotor 40. The motor-generator 10 is one example of a rotating electric machine. The motor-generator 10 is mounted on a vehicle. The vehicle is omitted in the drawings.

The stator 20 has an annular shape as a whole. The stator 20 includes a stator core 30 and segment coils 21 attached to the stator core 30. The stator core 30 has an annular shape as a whole. The stator core 30 thus has a central axis CA. The motor-generator 10 is mounted on the vehicle such that the central axis CA of the stator core 30 is orthogonal to an axis (second axis Y), which extends in an up-down direction of the vehicle. The stator core 30 is formed by stacking magnetic steel sheets, which are magnetic bodies.

Each segment coil 21 includes a coil end 22 that protrudes outward from a first end 30a of the stator core 30 in a direction along the central axis CA. The first end 30a may be either the left end or the right end of the stator core 30 in FIG. 1. For illustrative purposes, the left end of the stator core 30 in FIG. 1 is defined as the first end 30a. Also, each segment coil 21 includes a coil end 22 that protrudes outward from a second end 30b of the stator core 30 in a direction along the central axis CA. The second end 30b is located on the side opposite to the first end 30a. That is, the segment coils 21 include the coil ends 22, which protrude from the opposite end faces of the stator core 30, or from the first end 30a or the second end 30b. In FIG. 1, the segment coils 21 are collectively illustrated to have a cylindrical shape.

The rotor 40 has a columnar shape as a whole. The rotor 40 is located on the radially inner side of the stator 20. The rotor 40 includes a rotor shaft 41 and a rotor core 42. The rotor shaft 41 has the shape of a rod. A central axis of the rotor shaft 41 agrees with the central axis CA of the stator core 30. End portions of the rotor shaft 41 are connected to a case that surrounds the outer sides of the motor-generator 10. The case is omitted in the drawings. The rotor core 42 is annular. The inner circumferential surface of the rotor core 42 is fixed to the outer circumferential surface of the rotor shaft 41. The rotor core 42 is formed by stacking magnetic steel sheets, which are magnetic bodies. Although not illustrated, the rotor core 42 incorporates magnets. The magnets are embedded in slots formed in the magnetic steel sheets of the rotor core 42.

In the following description, an axis that extends along the central axis CA is defined as a first axis X. An axis that is orthogonal to the central axis CA is defined as a second axis Y. One of the directions along the first axis X is defined as a first positive direction X1, and the other direction along the first axis X is defined as a first negative direction X2. Also, one of the directions along the second axis Y is defined as a second positive direction Y1, and the other direction along the second axis Y is defined as a second negative direction Y2. It is assumed that the second negative direction Y2 agrees with the direction of gravitational force. That is, the second axis Y is an axis that extends in an up-down direction of the vehicle.

As shown in FIG. 1, the cooling oil passage 50 located on a side in the second positive direction Y1 with respect to the motor-generator 10. The cooling oil passage 50 is, for example, a pipe through which oil flows. The cooling oil passage 50 includes spray holes 51. The spray holes 51 are configured to spray oil toward the coil ends 22. The spray holes 51 are located on a side in the second positive direction Y1 with respect to the coil ends 22. The spray holes 51 are directed in the second negative direction Y2. One of the spray holes 51 is located directly above the coil ends 22 that are on a side in the first positive direction X1 with respect to the stator 20. Another one of the spray holes 51 is located directly above the coil ends 22 that are located on a side in the first negative direction X2 with respect to the stator 20. Oil in the cooling oil passage 50 is sprayed in the second negative direction Y2 through the spray holes 51 toward the coil ends 22.

<Stator>

Figure 2:
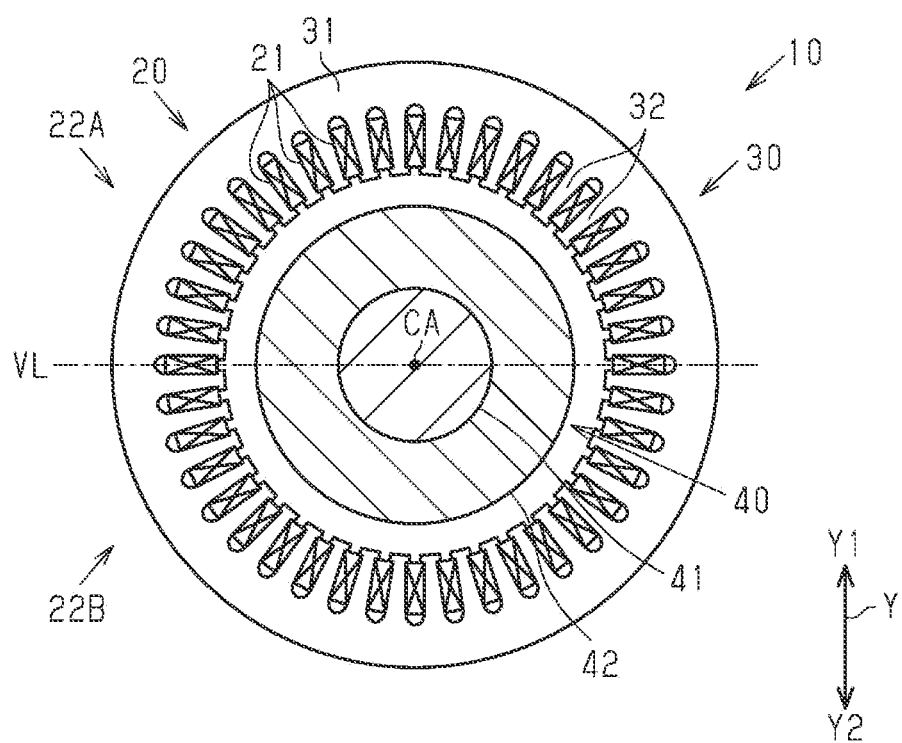
FIG. 2 is a schematic cross-sectional view taken along line 2-2 in FIG. 1.

As shown in FIG. 2, the stator core 30 includes a core body 31 and teeth 32. The core body 31 is annular. A central axis of the core body 31 agrees with the central axis CA of the stator core 30. The teeth 32 extend from the inner circumferential surface of the core body 31 toward the central axis CA. The teeth 32 are arranged to be equally spaced apart in the circumferential direction of the core body 31. Accordingly, a gap exists between each adjacent pair of the teeth 32. The segment coils 21 are each inserted into the gap between an adjacent pair of the teeth 32.

Figure 3:
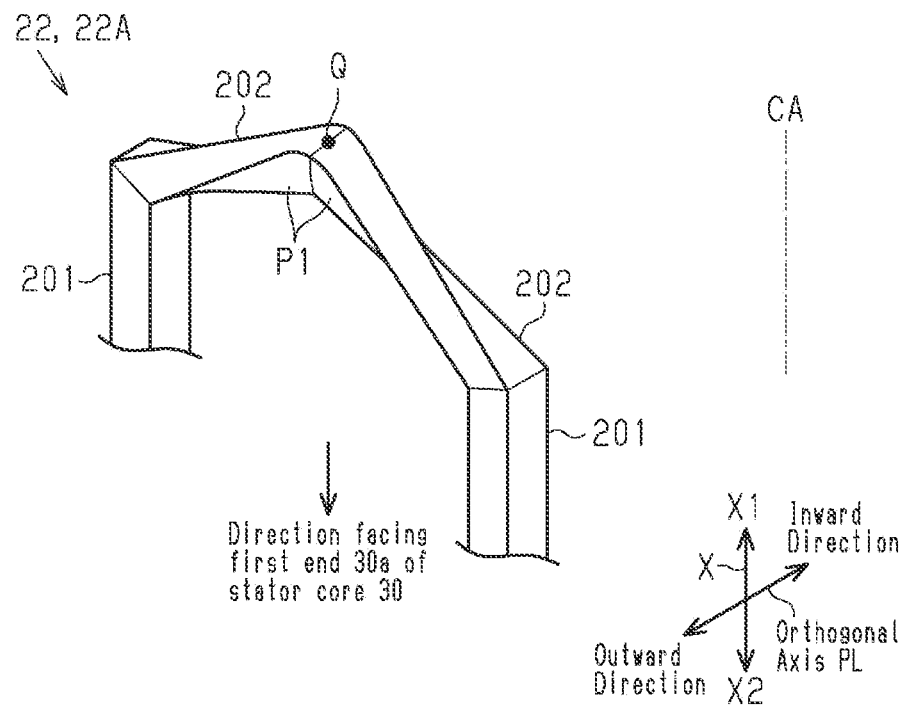
FIG. 3 is a partially enlarged view of a coil end in a first portion shown in FIG. 1.
Figure 4:
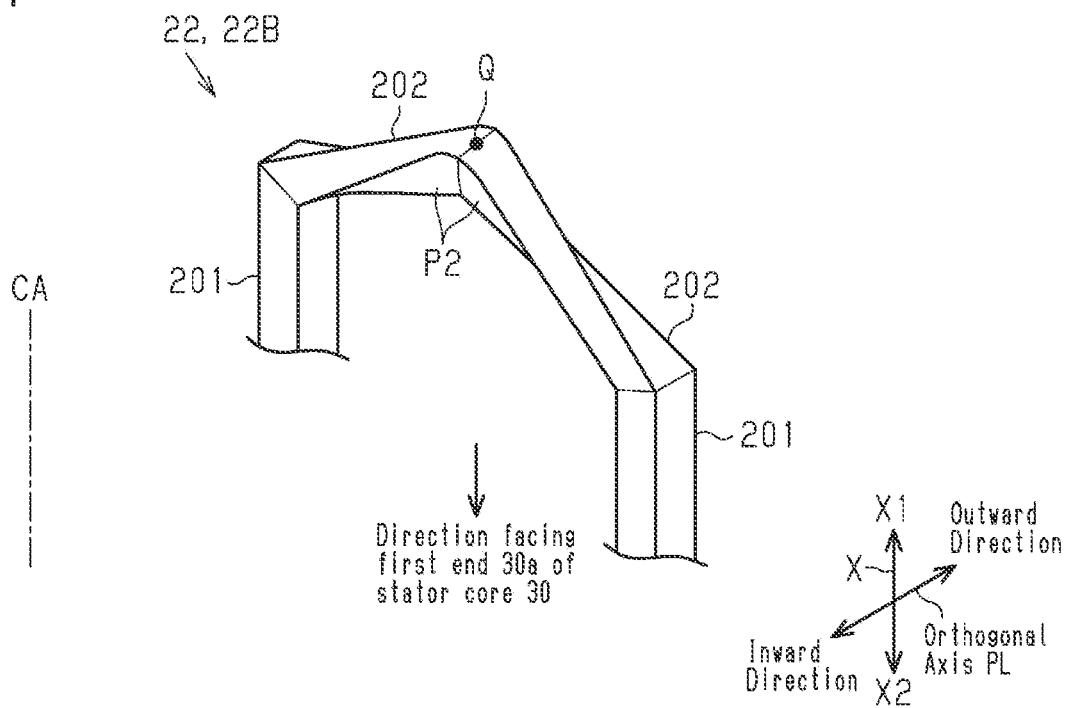
FIG. 4 is a partially enlarged view of a coil end in a second portion shown in FIG. 1.

As shown in FIGS. 3 and 4, each segment coil 21 has a loop shape as a whole. Each segment coil 21 is formed by welding ends of multiple wires to each other. FIGS. 3 and 4 show part of the loop of the segment coil 21. The segment coil 21 has a rectangular cross section. The segment coil 21 has a pair of straight sections 201 that extend linearly. The straight sections 201 extend parallel with each other. The segment coil 21 also has a pair of curved sections 202 that connect ends on the same side of the straight sections 201. Each straight section 201 is located between an adjacent pair of the teeth 32. One of each pair of the straight sections 201 is located between a pair of the teeth 32 different from another pair of the teeth 32 between which the other straight section 201 is located. The curved sections 202 form the coil end 22.

It is now assumed that, as shown in FIG. 2, an imaginary straight line VL extends orthogonal to both the central axis CA and the second axis Y when the stator 20 is viewed in the first negative direction X2. The imaginary straight line VL vertically divides coil ends 22 into two groups when the stator 20 is viewed in the first negative direction X2. The half of the coil ends 22 on the side in the second positive direction Y1 from the imaginary straight line VL, that is, the upper half of the coil ends 22, are in a first portion 22A. Also, the half of the coil ends 22 on the side in the second negative direction Y2 from the imaginary straight line VL, that is, the lower half of the coil ends 22, are in a second portion 22B.

<Coil End>

As shown in FIG. 3, each curved section 202 of each coil end 22 in the first portion 22A has four side surfaces about the wire of the coil. An outer peripheral surface P1, which is one of the four side surfaces, faces in a direction opposite from the central axis CA. An axis that is orthogonal to a plane that includes both straight sections 201 of the segment coil 21 is defined as an orthogonal axis PL. The outer peripheral surface P1 is a side surface that faces one of the two directions along the orthogonal axis PL from the curved section 202. In the following description, a direction along the orthogonal axis PL and away from the central axis CA is defined as an outward direction, and a direction facing the central axis CA is defined as an inward direction. In each coil end 22 in the first portion 22A, each outer peripheral surface P1 includes a first twisted surface, which is a twisted surface. The first twisted surface is configured such that the direction in which the first twisted surface faces becomes closer to the direction facing the stator core 30 as the first twisted surface extends toward the end of the curved section 202 closest to the first end 30a of the stator core 30. That is, the direction in which the first twisted surface faces becomes closer to the direction facing the straight section 201 as the first twisted surface extends toward the intersection between the straight section 201 and the curved section 202. In the example shown in FIG. 3, the direction in which each outer peripheral surface P1 faces becomes closer to the first negative direction X2 as the outer peripheral surface P1 extends toward the lower end of the curved section 202 in FIG. 3, that is, toward the end in the first negative direction X2. In the present embodiment, the entire outer peripheral surface P1 corresponds to the first twisted surface.

Specifically, a section in each curved section 202 that is farthest from the end of the stator core 30, that is, from the first end 30a, is defined as an apex Q. At the position of the apex Q, the outer peripheral surfaces P1 face in a direction substantially opposite from the central axis CA. That is, the outer peripheral surfaces P1 face outward. As the distance from the apex Q increases, the direction in which each outer peripheral surface P1 faces gradually becomes closer to the direction facing the stator core 30. In other words, the curved sections 202 are twisted. The curved sections 202 are twisted in opposite directions with respect to the apex Q. The twisted angle of the curved sections 202 is, for example, 90 degrees on one side of the apex Q, and 90 degrees on the other side of the apex Q.

As shown in FIG. 4, each curved section 202 in the second portion 22B has four side surfaces about the wire of the coil. An inner peripheral surface P2, which is one of the four side surfaces, faces in a direction facing the central axis CA, that is, faces inward. In other words, the inner peripheral surface P2 is a side surface that faces the other one of the two directions along the orthogonal axis PL from the curved section 202. In the second portion 22B, each inner peripheral surface P2 includes a second twisted surface, which is a twisted surface. The direction in which the second twisted surface faces becomes closer to the direction facing the stator core 30 as the second twisted surface extends toward the end of the curved section 202 closest to the stator core 30. That is, the direction in which the second twisted surface faces becomes closer to the direction facing the straight section 201 as the second twisted surface extends toward the intersection between the straight section 201 and the curved section 202. In the example shown in FIG. 4, the direction in which each inner peripheral surface P2 in the second portion 22B faces becomes closer to the downward direction as the inner peripheral surface P2 extends toward the lower end of the curved section 202.

Specifically, at the apex Q, each inner peripheral surface P2 faces in the direction facing the central axis CA, that is, faces inward. As the distance from the apex Q increases, the direction in which each inner peripheral surface P2 faces gradually becomes closer to the direction facing the stator core 30. In other words, the curved sections 202 are twisted. The curved sections 202 are twisted in opposite directions with respect to the apex Q. The twisted angle of the curved sections 202 is, for example, 90 degrees on one side of the apex Q, and 90 degrees on the other side of the apex Q.

In FIGS. 3 and 4, the curved sections 202 are illustrated to have the same shape, but face in opposite directions, or in the inward direction and the outward direction. That is, the curved sections 202 of each coil end 22 in the first portion 22A and the curved sections 202 of each coil end 22 in the second portion 22B are twisted in opposite directions and have symmetric shapes. FIGS. 3 and 4 illustrate a configuration in which the left end of the stator core 30, as viewed in FIG. 1, is defined as the first end 30a. However, if the right end of the stator core 30, as viewed in FIG. 1, is defined as the first end 30a, the stator core 30 can be configured such that the first twisted surfaces face in the outward direction at the apex Q, and the second twisted surfaces face in the inward direction at the apex Q. That is, the first twisted surfaces and the second twisted surfaces do not necessarily need to be provided only at the coil ends 22 that protrude from the first end 30a of the stator core 30, but may also be provided at the coil ends 22 that protrude from the second end 30b of the stator core 30.

Figure 5:
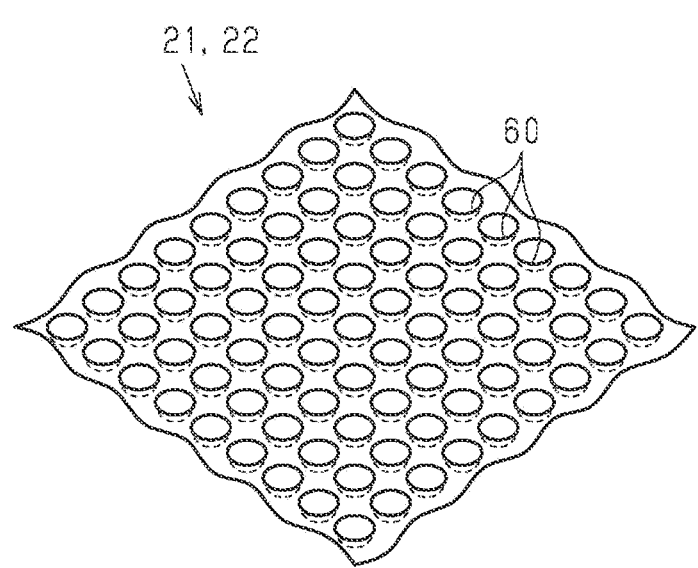
FIG. 5 is a schematic diagram showing dimples in the segment coil of FIG. 3 or 4.

As shown in FIG. 5, the surface of each segment coil 21, which includes side surfaces, includes dimples 60. The dimples 60 are circular recesses in a plan view. The dimples 60 are arranged to be equally spaced apart. The diameter of each dimple 60 is approximately 0.1 to 1 mm. The depth of each dimple 60 is approximately 0.1 to 1 mm. The countless dimples 60 are designed to cause the Magnus effect on oil flowing along the surfaces of the segment coils 21. The dimples 60 are omitted in FIGS. 3 and 4.

Operation of Present Embodiment

When oil in the cooling oil passage 50 is sprayed through the spray holes 51 toward the coil ends 22, the sprayed oil is poured onto the outer peripheral surfaces P1 of the coil ends 22 in the first portion 22A, which are located on a side in the second negative direction Y2 with respect to the spray holes 51. Most of the oil poured onto the outer peripheral surfaces P1 is guided to the straight sections 201 along the twisted surfaces. That is, most of the oil is guided toward the stator core 30. The oil guided to the stator core 30 flows along the stator core 30 to be spread over the entire stator core 30. Some of the oil that flows along the stator core 30 flows to other segment coils 21 located on a side in the second negative direction Y2. The oil repeats these actions to spread over all the coil ends 22 in the first portion 22A.

The oil that dribbles from the coil ends 22 in the first portion 22A is poured onto the inner peripheral surfaces P2 of the coil ends 22 in the second portion 22B. Most of the oil poured onto the inner peripheral surfaces P2 in the second portion 22B is guided to the straight sections 201 along the twisted surfaces. That is, most of the oil is guided toward the stator core 30. The oil guided to the stator core 30 flows along the stator core 30 to be spread over the entire stator core 30. Some of the oil that flows along the stator core 30 flows to other segment coils 21 located on a side in the second negative direction Y2. The oil repeats these actions to spread over all the coil ends 22 in the second portion 22B.

Advantages of Present Embodiment (1) It is assumed that, in a comparative example, oil poured onto segment coils 21 in a first portion 22A flows in a direction opposite from a stator core 30. In this case, the oil dribbles to the outside of a stator 20. Thus, the oil that has dribbled from one of the segment coils 21 will not be poured onto other segment coils 21, and sufficient cooling effect by oil cannot be expected. Also, even if oil dribbles along some of the coil ends 22, all the coil ends 22 cannot be cooled if the oil is not spread. In contrast, the above-described embodiment allows the oil sprayed onto the segment coils 21 in the first portion 22A to easily flow toward the stator core 30. This reduces the amount of oil that spills to the outside of the stator 20. The oil guided to the stator core 30 flows along the stator core 30 and is easily spread over the entire stator core 30. The oil falls along a great number of the segment coils 21 and thus efficiently cools the coil ends 22.

(2) In the above-described embodiment, the oil that has dribbled onto the coil ends 22 flows along the twisted surfaces of the coil ends 22, so that the oil is in contact with the segment coils 21 for a relatively extended period of time. The extended contact between the oil and the segment coils 21 promotes heat exchange between the oil and the segment coils 21.

(3) In the above-described embodiment, the oil that has dropped from the segment coils 21 in the first portion 22A contacts the inner peripheral surfaces P2 of the segment coils 21 in the second portion 22B. The oil that has contacted the inner peripheral surfaces P2 of the segment coils 21 in the second portion 22B easily flows toward the stator core 30. This reduces the amount of oil that spills to the outside of the stator 20. The oil guided to the stator core 30 flows along the stator core 30 and is easily spread over the entire stator core 30. The oil falls along a great number of the segment coils 21 and thus cools the coil ends 22 effectively.

(4) In the above-described embodiment, each segment coil 21 includes the countless dimples 60. This allows the oil that flows along the segment coils 21 to flow smoothly along the surfaces of the segment coils 21.

<Modifications>

The above-described embodiment may be modified as follows. The above-described embodiment and the following modifications can be combined as long as the combined modifications remain technically consistent with each other.

In the above-described embodiment, the positions of the spray holes 51 do not necessarily need to be directly above the coil ends 22. The above described advantages can be achieved as long as the spray holes 51 are located on a side in the second positive direction Y1 with respect to the coil ends 22.

In the above-described embodiment, the number of the spray holes 51 may be one or may be increased.

The shape of the coil ends 22 is not limited to that described in the above-described embodiment. Also, the shape of the coil ends 22 on the side in the first positive direction X1 and the shape of the ends 22 on the side in the first negative direction X2 may be different from each other. As long as the segment coils 21 including the coil ends 22 in the first portion 22A have the outer peripheral surfaces P1 that face outward, the technique related to the twisted surfaces can be employed.

In the above-described embodiment, all the outer peripheral surfaces P1 in the first portion 22A do not necessarily need to include twisted surfaces. That is, only some of the outer peripheral surfaces P1 may include twisted surfaces. Likewise, all the outer peripheral surfaces P2 in the second portion 22B do not necessarily need to include twisted surfaces.

The segment coils 21 in the second portion 22B do not necessarily need to include twisted surfaces. If at least the segment coils 21 in the first portion 22A include twisted surfaces, oil can be spread over all the coil ends 22.

In the above-described embodiment, all the segment coils 21 in the first portion 22A do not necessarily include twisted surfaces in the curved sections 202. That is, it suffices if some of the segment coils 21 include twisted surfaces.

In the above-described embodiment, the segment coils 21 in the first portion 22A have twisted surfaces that are twisted in one direction, and the segment coils in the second portion 22B have twisted surfaces that are twisted in another direction. These two types of segment coils 21 may be provided in a mixed state in the vicinity of the imaginary straight line VL.

The diameter and the depth of the dimples 60 are not limited to those described in the above-described embodiment. The segment coils 21 do not necessarily need to include the dimples 60.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:
1. A cooling system, comprising:
a rotating electric machine mounted on a vehicle; and
a cooling oil passage through which oil flows, wherein
the rotating electric machine includes:
   a stator core; and
   segment coils attached to the stator core, each of the segment coils having a rectangular cross section that has four side surfaces about a wire of the segment coil,
the stator core includes:
   an annular core body including a central axis, the central axis being orthogonal to an axis that extends in an up-down direction of the vehicle; and
   teeth that extend from an inner circumferential surface of the core body toward the central axis,
each of the segment coils has a pair of straight sections that extend linearly and a pair of curved sections that connect ends on a same side of the straight sections,
each of the straight sections is located between an adjacent pair of the teeth,
each of the curved sections includes a coil end, the coil end protruding outward from a first end of the stator core in a direction along the central axis,
the cooling oil passage includes a spray hole, the spray hole being configured to spray oil toward the coil ends,
the spray hole is located above the coil ends,
as viewed in a direction along the central axis, a straight line that is orthogonal to both the central axis and the axis extending in the up-down direction is defined as an imaginary straight line,
half the coil ends above the imaginary straight line are in a first portion,
half the coil ends below the imaginary straight line are in a second portion,
each of the segment coils in the first portion includes an outer peripheral surface, the outer peripheral surfaces facing in a direction opposite from the central axis, the outer peripheral surface is one of the four side surfaces,
the outer peripheral surface of each of the segment coils includes a twisted surface,
the twisted surfaces in the outer peripheral surfaces of the segment coils are first twisted surfaces,
each of the first twisted surfaces is configured such that a direction in which the first twisted surface faces becomes closer to a direction facing the stator core as the twisted surface extends toward the first end of the stator core,
each of the segment coils in the second portion includes an inner peripheral surface, the inner peripheral surfaces facing in a direction facing the central axis, the inner peripheral surface is one of the four side surfaces, the inner peripheral surface is different from the outer peripheral surface,
the inner peripheral surface of each of the segment coils includes a second twisted surface, and
each of the second twisted surfaces is configured such that a direction in which the second twisted surface faces becomes closer to the direction facing the stator core as the second twisted surface extends toward the first end of the stator core.

2. The cooling system according to claim 1, wherein each of the segment coils includes dimples in a surface of the segment coil, the dimples being circular recesses in a plan view.

3. The cooling system according to claim 1, wherein the direction in which the first twisted surface faces becomes closer to the direction facing the straight section as the first twisted surface extends toward the intersection between the straight section and the curved section,
wherein the direction in which the second twisted surface faces becomes closer to the direction facing the straight section as the second twisted surface extends toward the intersection between the straight section and the curved section.

4. The cooling system according to claim 1, wherein the direction in which each outer peripheral surface faces becomes closer to the downward direction as the outer peripheral surface extends toward the lower end of the curved section,
wherein the direction in which each inner peripheral surface in the second portion faces becomes closer to the downward direction as the inner peripheral surface extends toward the lower end of the curved section.

5. The cooling system according to claim 1, wherein a section in each curved section that is farthest from the first end of the stator core is defined as an apex,
at the position of the apex, the outer peripheral surfaces face in a direction substantially opposite from the central axis,
as the distance from the apex increases, the direction in which each outer peripheral surface faces gradually becomes closer to the direction facing the stator core,
at the apex, each inner peripheral surface faces in the direction facing the central axis,
as the distance from the apex increases, the direction in which each inner peripheral surface faces gradually becomes closer to the direction facing the stator core.

6. The cooling system according to claim 1, wherein the curved sections are twisted in opposite directions with respect to the apex.

7. The cooling system according to claim 6, wherein the twisted angle of the curved sections is 90 degrees on one side of the apex, and 90 degrees on the other side of the apex.

8. The cooling system according to claim 1, wherein the curved sections of each coil end in the first portion and the curved sections of each coil end in the second portion are twisted in opposite directions in the inward direction and the outward direction and have symmetric shapes.

9. The cooling system according to claim 1, wherein the spray hole is located directly above the coil ends in the first portion.

10. The cooling system according to claim 1, wherein the spray hole, the coil ends in the first portion and the coil ends in the second portion are positioned such that the oil from the spray hole is poured onto the coil ends in the second portion via the coil ends in the first portion.

11. A stator for a rotating electric machine, the stator comprising:
a stator core; and
segment coils attached to the stator core, each of the segment coils having a rectangular cross section that has four side surfaces about a wire of the segment coil, wherein
the stator core includes:
an annular core body including a central axis; and
teeth that extend from an inner circumferential surface of the core body toward the central axis,
each of the segment coils has a pair of straight sections that extend linearly and a pair of curved sections that connect ends on a same side of the straight sections,
each of the straight sections is located between an adjacent pair of the teeth,
each of the curved sections includes a coil end, the coil end protruding outward from a first end of the stator core in a direction along the central axis,
as viewed in a direction along the central axis, a straight line that is orthogonal to the central axis is defined as an imaginary straight line,
half the coil ends on one side of the imaginary straight line are in a first portion,
half the coil ends on another side of the imaginary straight line are in a second portion,
each of the segment coils in the first portion includes an outer peripheral surface, the outer peripheral surfaces facing in a direction opposite from the central axis, the outer peripheral surface is one of the four side surfaces,
the outer peripheral surface of each of the segment coils includes a twisted surface,
the twisted surfaces in the outer peripheral surfaces of the segment coils are first twisted surfaces,
each of the first twisted surfaces is configured such that a direction in which the first twisted surface faces becomes closer to a direction facing the stator core as the twisted surface extends toward the first end of the stator core,
each of the segment coils in the second portion includes an inner peripheral surface, the inner peripheral surfaces facing in a direction facing the central axis, the inner peripheral surface is one of the four side surfaces, the inner peripheral surface is different from the outer peripheral surface,
the inner peripheral surface of each of the segment coils includes a second twisted surface, and
each of the second twisted surfaces is configured such that a direction in which the second twisted surface faces becomes closer to the direction facing the stator core as the second twisted surface extends toward the first end of the stator core.

12. The stator according to claim 11, wherein the direction in which the first twisted surface faces becomes closer to the direction facing the straight section as the first twisted surface extends toward the intersection between the straight section and the curved section,
wherein the direction in which the second twisted surface faces becomes closer to the direction facing the straight section as the second twisted surface extends toward the intersection between the straight section and the curved section.

13. The stator according to claim 11, wherein the direction in which each outer peripheral surface faces becomes closer to the downward direction as the outer peripheral surface extends toward the lower end of the curved section,
wherein the direction in which each inner peripheral surface in the second portion faces becomes closer to the downward direction as the inner peripheral surface extends toward the lower end of the curved section.

14. The stator according to claim 11, wherein a section in each curved section that is farthest from the first end of the stator core is defined as an apex,
at the position of the apex, the outer peripheral surfaces face in a direction substantially opposite from the central axis, as the distance from the apex increases, the direction in which each outer peripheral surface faces gradually becomes closer to the direction facing the stator core, at the apex, each inner peripheral surface faces in the direction facing the central axis, as the distance from the apex increases, the direction in which each inner peripheral surface faces gradually becomes closer to the direction facing the stator core.

15. The stator according to claim 11, wherein the curved sections are twisted in opposite directions with respect to the apex.

16. The stator according to claim 15, wherein the twisted angle of the curved sections is 90 degrees on one side of the apex, and 90 degrees on the other side of the apex.

17. The stator according to claim 11, wherein the curved sections of each coil end in the first portion and the curved sections of each coil end in the second portion are twisted in opposite directions in the inward direction and the outward direction and have symmetric shapes.

18. The stator according to claim 11, wherein the spray hole is located directly above the coil ends in the first portion.

19. The stator according to claim 11, wherein the spray hole, the coil ends in the first portion and the coil ends in the second portion are positioned such that the oil from the spray hole is poured onto the coil ends in the second portion via the coil ends in the first portion.

* * * * *